(No Model.)

J. SWINBURNE.
CONDUCTOR.

No. 590,120.

Patented Sept. 14, 1897.

WITNESSES:

INVENTOR

ATTORNEYS.

UNITED STATES PATENT OFFICE.

JAMES SWINBURNE, OF LONDON, ENGLAND, ASSIGNOR TO THE SULPHIDE CORPORATION, (ASHCROFT'S PROCESS,) LIMITED, OF SAME PLACE.

CONDUCTOR.

SPECIFICATION forming part of Letters Patent No. 590,120, dated September 14, 1897.

Application filed February 11, 1897. Serial No. 622,984. (No model.)

*To all whom it may concern:*

Be it known that I, JAMES SWINBURNE, of 66 Victoria Street, Westminster, London, England, have invented new and useful Improvements in Conductors for Telegraphs, Telephones, and Electrical Distribution, of which the following is a full, clear, and exact description.

My invention has for its object the reduction of the cost of distribution of electrical power, and conductors made in accordance with it can be employed for distributing electrical power in lighting, traction, or similar systems or for telegraph or telephone lines.

At present in large power systems copper is invariably used as the conducting material; but the conductivity of fairly pure zinc is such that zinc can be used commercially as a cheaper substitute for copper to perform the same work. Zinc may be used in many cases for telegraph and especially telephone wires. For a given expenditure a certain conductivity or conductance is obtained, but the conductor is larger, having a higher specific resistance than copper. This reduces the evil effects of self-induction, or, as it is commonly called, the "skin effect," so that messages can be more easily sent.

According to my invention zinc should be deposited electrically by any suitable process, such as Ashcroft's, and may, if it is found to pay, be specially refined by electrolysis or distillation. It is then compressed, so as to increase its density, tenacity, and conductivity, by rolling or drawing it into bars, rods, or wires, as the case may be, and used for electric mains, leads, or conductors.

Figure 1:
Figure 2:

In the accompanying drawings, Figure 1 is a side elevation, and Fig. 2 is a cross-section, of a zinc conductor such as herein described.

Conductors made according to my invention are also more economical than those of copper when subject to corrosion by electrolysis, as the money value of the metal eaten off by a given leakage-current is less. Similar considerations apply to determine the most suitable forms of joints and connections to be used with the new conductors, so as to utilize to the full the change of sectional area and greater cheapness of the material.

I claim—

1. An electric conductor made of electrically-deposited zinc, compressed to increase its density and tenacity, substantially as described.

2. An electric conductor made of electrically-deposited metal, compressed to increase its density and tenacity, substantially as described.

JAMES SWINBURNE.

In presence of—
 W. M. HARRIS,
 FRED C. HARRIS.